United States Patent [19]

Cooper et al.

[11] Patent Number: 5,233,942
[45] Date of Patent: Aug. 10, 1993

[54] CARRYING CASE WHICH ATTACHES TO A PET COLLAR

[76] Inventors: Phyllis L. Cooper, 4805 E. Kentucky Ave., Denver, Colo. 80222; Todd S. Reed, 901 Jasmine St., Denver, Colo. 80220; Robert E. Collawn, 1864 Race St., Denver, Colo. 80206

[21] Appl. No.: 718,956
[22] Filed: Jun. 21, 1991
[51] Int. Cl.⁵ ............................................ A01K 27/00
[52] U.S. Cl. ................................. 119/792; 224/240; 119/858
[58] Field of Search ............... 119/106, 109, 96; 40/300, 301, 302, 303, 304, 633; 224/236, 240, 237, 224

[56] References Cited

U.S. PATENT DOCUMENTS

| | | | |
|---|---|---|---|
| 870,784 | 11/1907 | Huff | 119/106 |
| 887,072 | 5/1908 | Delaney | 119/106 |
| 1,262,447 | 4/1918 | Carr | 119/106 |
| 1,539,744 | 5/1925 | Kelly | 119/106 |
| 2,680,315 | 6/1954 | McHugh et al. | 119/106 |
| 2,799,245 | 7/1957 | Ruggiero et al. | 119/106 |
| 2,833,250 | 5/1958 | Beebe | 119/106 |
| 2,889,807 | 6/1959 | Beebe | 119/106 |
| 3,477,410 | 11/1969 | Lettieri | 119/109 |
| 3,542,263 | 11/1970 | Callahan | 224/237 |
| 4,174,793 | 11/1979 | Wiscwaty | 224/240 |
| 4,178,879 | 12/1979 | Cunningham | 119/106 |
| 4,328,767 | 5/1982 | Peterson | 119/109 |
| 4,584,967 | 4/1986 | Taplin | 119/109 |
| 4,774,801 | 10/1988 | Johansen et al. | 119/109 |
| 4,787,340 | 11/1988 | Kirtley | 119/106 |
| 4,852,783 | 8/1989 | Bryden et al. | 224/240 |
| 4,907,729 | 3/1990 | Hess, III | 224/240 |
| 5,038,719 | 8/1991 | McDonough | 119/109 |

Primary Examiner—Robert P. Swiatek
Assistant Examiner—Todd E. Manahan
Attorney, Agent, or Firm—Charles C. Corbin

[57] ABSTRACT

Disclosed is a leash holder assembly that is removably mountable to the collar of a pet, and including a leash holder made of flexible material and having face-to-face rectangular panels that are stitched along their bottom and side edges in such a manner to provide an open-topped pouch for storing a leash in coiled-up condition, and including a rectangular closure flap that can fold over the top of the pouch to close the pouch, Velcro fastening elements used to secure the closure flap. Velcro equipped tabs secure the holder to the pet collar and the leash is attached at one of its ends to the collar and the handle of the stored leash protrudes through an opening in the pouch. The leash is quickly deployable when required by grasping the handle and pulling it away from the pouch so that the leash uncoils from the grasp of the pouch.

2 Claims, 3 Drawing Sheets

CARRYING CASE WHICH ATTACHES TO A PET COLLAR

BACKGROUND OF THE INVENTION

1. Field of the Invention

The present invention relates to carrying pouches for pets that are attachable to a pet collar, and more particularly, to such a pouch that stores a leash for quick deployment.

2. Description of the Prior Art

The prior art discloses a fair number of devices that are attachable to pet collars. One group of patents involves retracting leash/collars, such as shown in U.S. Pat. Nos. 870,784; 887,072; 2,889,807; 2,833,230; 3,477,410; and 4,328,767. These patents describe retractable leashes that may be permanently attached to a pet's collar. In all cases, the designs appear to be burdensome for the pet to wear. Not only is the housing for the retractable leash bulky, but in many cases it actually hangs from the pet's collar, so that it could interfere with the pet's comfort while sleeping or moving.

Another group of devices that permanently attach to a pet's collar is disclosed in U.S. Pat. Nos. 2,799,245; 2,919,676; 4,584,967; and 4,787,340. These show leashes that either wrap around the pet's collar or neck in some fashion or protrude from the collar. The leash/collar combination shown in U.S. Pat. No. 2,799,245 appears to be awkward for the pet to wear and could present a possible hazard if the pet were to accidently catch the leash handle on an object that would pull the leash out of its attachment to the collar. Although U.S. Pat. Nos. 4,584,967 and 4,787,340 depict leashes that are attached to collars, it appears that neither the collars nor the leashes are designed to be removed from the pet when not in use. Therefore, the leash is not always easily accessible to the handler.

Still another group of patents shows devices attached to pet collars and includes U.S. Pat. Nos. 1,262,447; 1,539,744; 2,680,315; and 4,178,879. However, none of these attachments are designed to contain a leash.

SUMMARY OF THE INVENTION

In view of the aforestated prior art drawbacks, it is a general object of the present invention to provide improved collar-mounted means for storing a pet leash.

Another object is to provide such a carrying case that allows a pet to comfortably carry its stored leash.

Yet another object is to provide a collar-mounted carrying case or pouch for a leash that is secured at one of its ends to the collar, the bulk of the leash stored in a rolled condition within the pouch, such that the leash is quickly deployable from the carrier when necessary.

Still another object of the invention is to provide a leash-storing pouch that can readily be attached by hook and loop fastener material to any pet collar or harness.

These and other objects and advantages are provided by the present invention which is removably mountable to a pet collar, the collar having affixed to it an attachment ring, the invention featuring, in combination, a leash having one end attachable to the ring, an elongate intermediate portion of a relatively thin material with a handle portion at the other end, and a storage pouch of flexible material that includes a first generally flat panel that lies in face-to-face relationship with a second generally rectangular panel, the panels secured to each other along a rear edge, bottom edge, and partly along forward edges and a closure flap extending from the top of the first panel and having a velcro strip that can engage a mating Velcro strip carried on an outside wall of the second panel. A Velcro equipped tab depends from the rear wall of the first panel and can wrap around the lower edge of the pouch to engage a mating Velcro on the second panel and is adapted to be engaged over the collar so as to removably mount the pouch to the collar. An additional Velcro-equipped tab extends in a forward direction from a front edge of the pouch and be engaged through the attached ring and secured to a strip of mating Velcro material on the back wall of the first panel. The intermediate portion of the leash is adapted to be wound around one's fingers to form a bundle that is receivable in the storage space of the holder, whereby when the closure flap is closed, an aperture is provided in an upper corner of the holder, through which aperture the leash handle extends, the pouch ordinarily retaining the rolled leash, yet allowing immediate, quick deployment of the leash by pulling outwardly on the handle which action quickly unreels the leash from the closed holder.

DETAILED DESCRIPTION OF THE INVENTION

Figure 1:
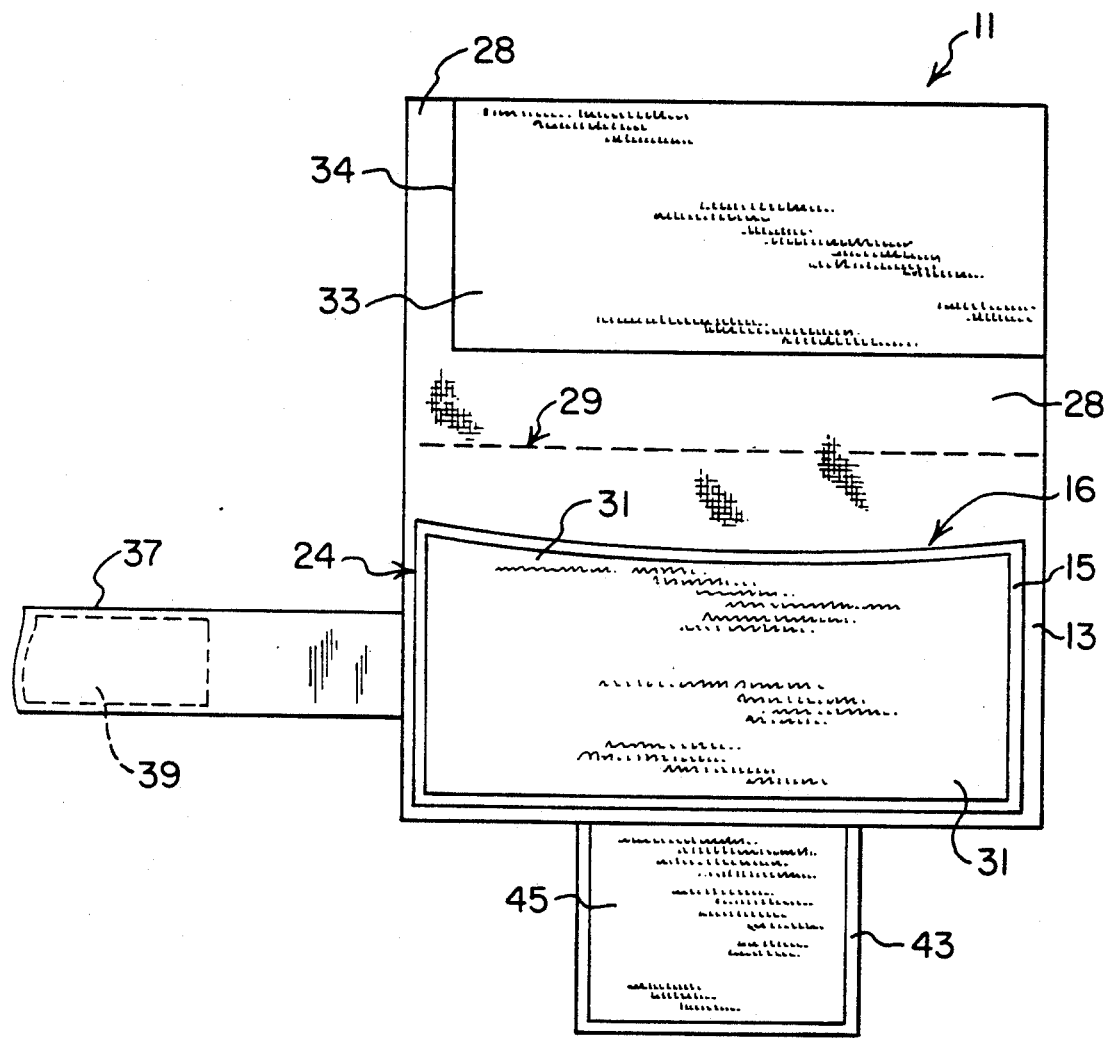
FIG. 1 is a plan view showing a pet leash holder according to the present invention attached to a collar and with closure flap and velcro-equipped tabs open.
Figure 2:
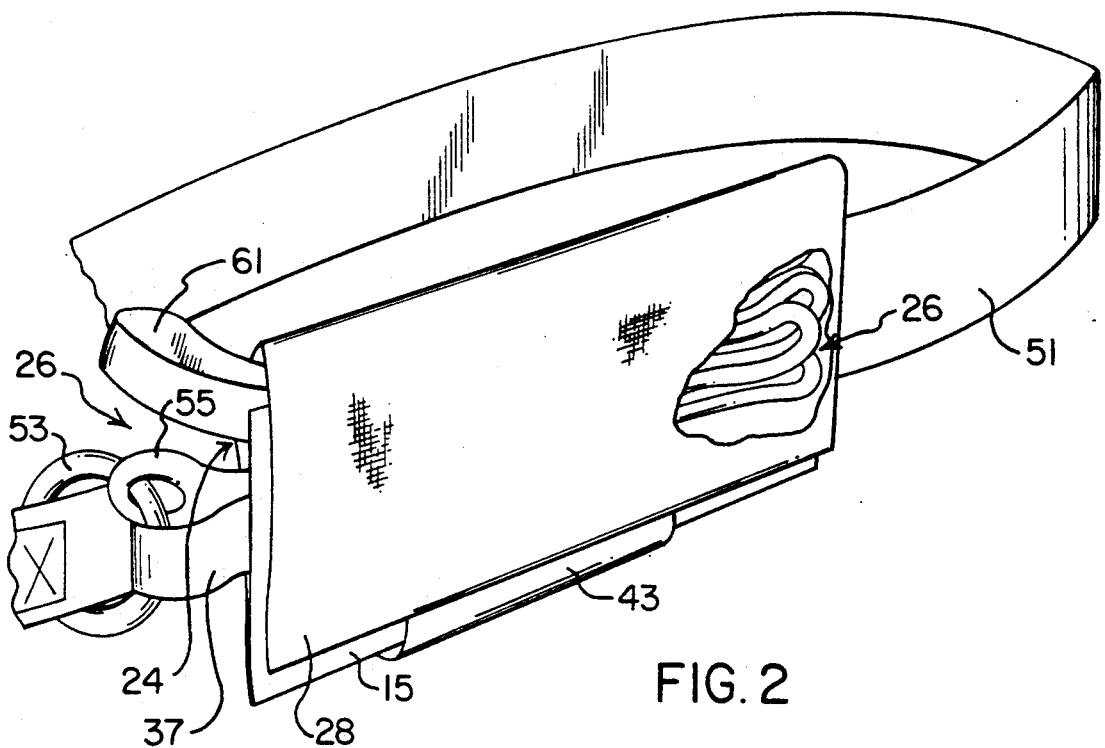
FIG. 2 is a perspective view with parts broken away for clarity, showing a leash holder and leash combination according to the invention, installed on a pet collar.

Referring now to the drawings, FIG. 1 shows that a preferred embodiment includes a carrying case 11, shown here opened, and including a first panel 13 and a second panel 15 secured to panel 13 by stitching along its bottom and side edges so as to form a pouch having a top opening at 16 and an unstitched portion in the upper lefthand corner that provides an opening 24, also shown in FIG. 2. The pouch is made sufficiently large to hold the bulk of a rolled-up leash 26, shown in FIG. 2, which will be more fully described hereinafter. Holder 11 also has a closure flap 28 that is foldable along a general crease 29 to bring a strip 33 of Velcro hook material into engagement with strip 31 of Velcro loop material carried on panel 15. Note that Velcro strip 33 is stitched on all sides except at side 34, which provides an opening at side 34 for insertion of flat articles such as an identification card for the pet. A tab 37 extends from the forward edge of panel 13 as shown in FIG. 1 and is equipped with a Velcro strip 39.

Figure 3:
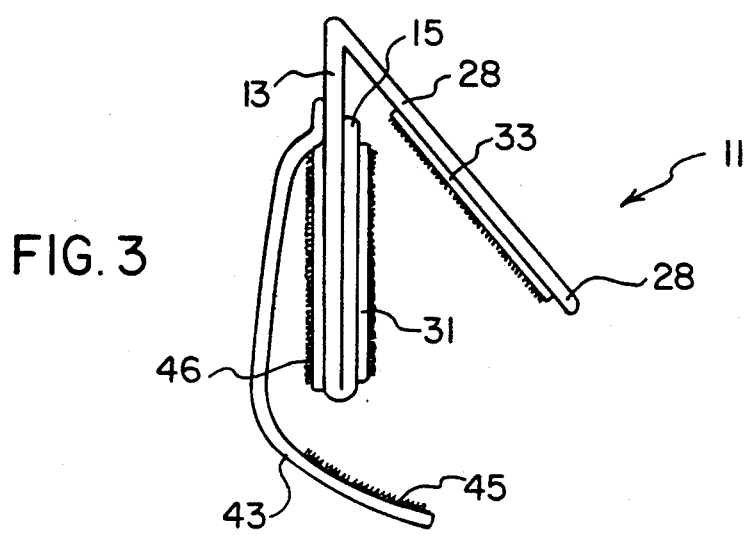
FIG. 3 is a side elevational view of a leash holder according to the present invention.
Figure 4:
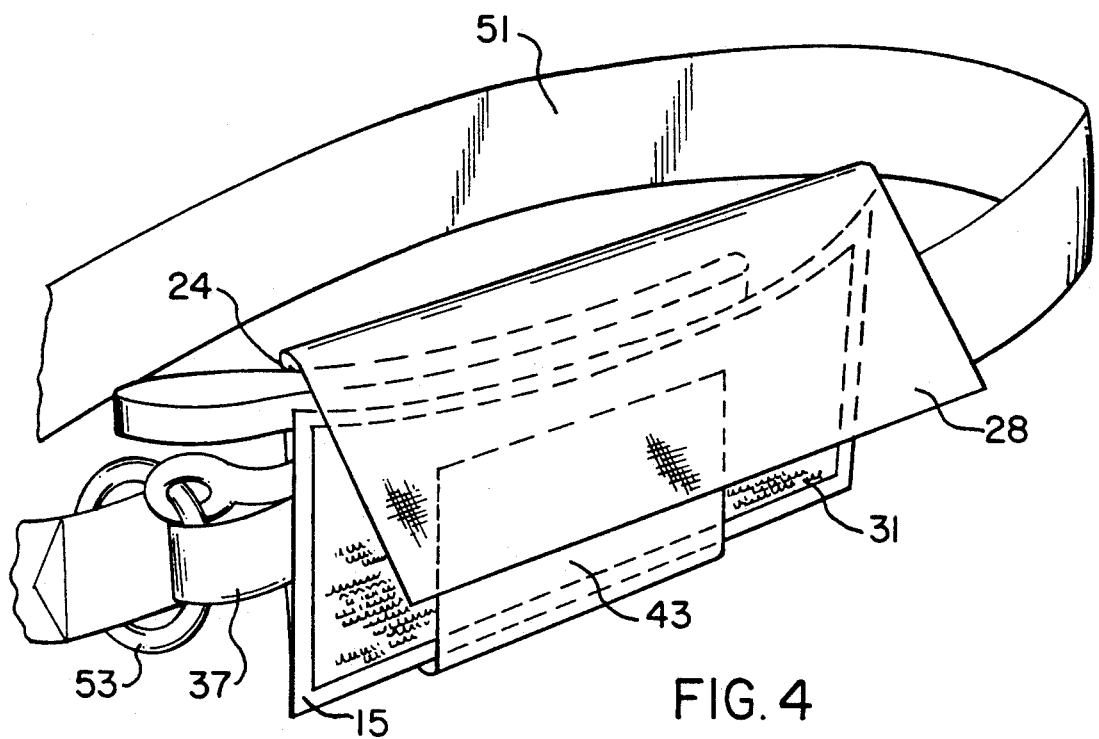
FIG. 4 is another perspective view similar to FIG. 2.
Figure 5:
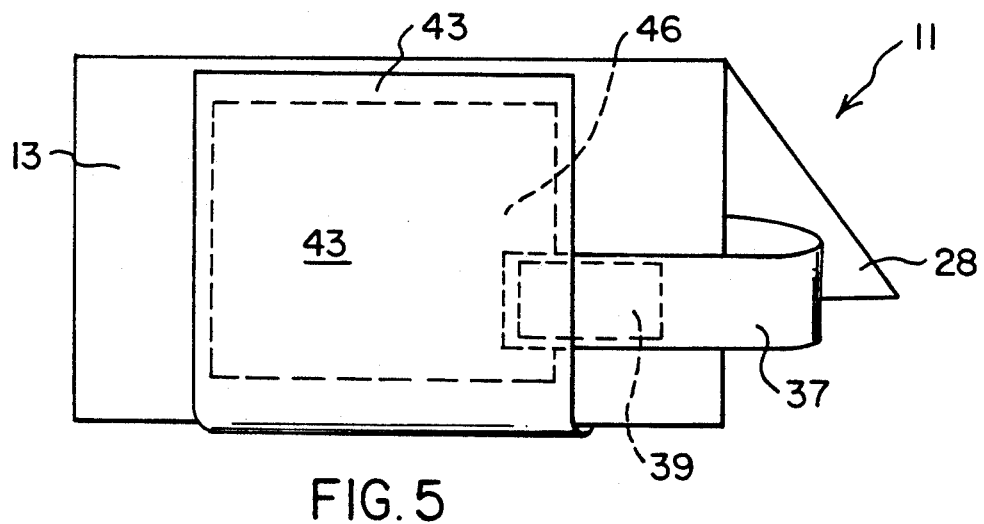
FIG. 5 is a rear perspective view of the holder of the invention.

A rear view of holder 11 is best seen in FIG. 5, where the holder 11 is seen to further comprise a flap 43, best illustrated in FIGS. 1, 3, 4, and 5, having strip 45 of Velcro hook material which is designed to engage strip 31 of loop material. There is another patch 46 of velcro loop material affixed to the back of panel 13 as FIGS. 3 and 5 show. This patch 46 is to be engaged by the hook material of strip 39 of the tab 37.

The holder 11 can be attached to a pet collar 51, shown in FIG. 2 by first securing the device to the collar ring 53 as illustrated in FIGS. 2 and 4, using tab 37. Then the tab 43 is engaged over the collar 51 and attached as illustrated in FIGS. 2 and 4. The leash 26, as best shown in FIG. 2, has one end that is secured to ring 53 with a conventional snap hook 55. The leash features an elongated flexible portion and there is a flexible handle 61 attached to the free end of the leash.

Once the holder 11 and leash 26 are secured to the collar 51 and ring 53 in the manner described above, the flap 28 is opened to allow the leash to be stored. The cord 59 of leash 26 can then be wound around one's fingers and formed into a number of turns, and then placed within the pouch cavity in a closely packed condition. Handle 61 is positioned to protrude through opening 24 which is provided after closure flap 28 is closed, as shown in FIG. 2. Although the roll of cord 59 is closely packed within the pouch of the holder, it should be appreciated that the highly flexible and bendable cord will engage itself in a slidable manner. Thus, the described assembly has the particular added advantage of being immediately and directly deployable from the grasp of the holder by pulling handle 61 outwardly of the pouch, which in turn causes the cord 59 to readily uncoil and move completely from the confines of the holder 11. It is particularly important to note here that deployment occurs without the necessity of first opening the closure flap 28.

While there has been described a particular embodiment of the invention, it will be obvious to those skilled in the art that various changes and modifications may be made therein without departing from the invention, therefore it is aimed to cover all such changes and modifications as fall within the true scope and spirit of the invention.

I claim:

1. A combination leash holder and leash assembly mountable to a pet collar, the collar having an attachment ring affixed thereto, said assembly including:
   a) a pouch of flexible material for storing said leash, said pouch having first and second rectangular panels lying in face-to-face relationship and said panels joined to each other along their bottom edge potions, first side edges and partially up the other side edges of said panels, leaving opposed unattached edges at an upper corner of said pouch, and a Velcro strip affixed to the outside of said second panel and to the outside of said first panel, respectively, and said panels providing a storage space therebetween;
   b) a rectangular closure flap extending from the top edge of said first panel and having a strip of Velcro material affixed thereto, said flap being foldable over the top of said space to engage the Velcro strip on said second panel to give said pouch a closed configuration that provides an aperture at said upper corner of said pouch;
   c) a flexible tab extending forwardly from a forward edge of said pouch, and having a strip of Velcro material attached thereto, said tab adapted to be engaged through said attachment ring and fastened to the Velcro strip on said first panel;
   d) an attachment tab extending from said first panel and equipped with a Velcro strip and wrappable around said collar and around the lower edge of said pouch to fasten to said Velcro strip on said second panel, to releasably secure said pouch about said and collar;
   e) a leash comprised of a highly flexible material, one end of said lease adapted to be removably connected to said ring, and the other end terminating in a flexible handle;
   whereby said leash is windable into a roll of plural windings, said pouch adapted to receive said roll substantially within said storage space of said closed pouch with, said handle protruding out of said aperture, and whereby said pouch in closed configuration embraces said leash in a manner to allow said leash to be completely deployed by pulling said handle out of said aperture and away from said pouch, whereby said leash is unreeled from within said storage space of said closed pouch.

2. Combination as defined in claim 1 wherein said leash slidably engages itself when formed into a closely packed roll of plural windings.

* * * * *